(12) United States Patent
Kataoka et al.

(10) Patent No.: US 11,539,258 B2
(45) Date of Patent: Dec. 27, 2022

(54) ELECTRIC OIL PUMP

(71) Applicant: Nidec Tosok Corporation, Zama (JP)

(72) Inventors: Shigehiro Kataoka, Zama (JP); Yoshiyuki Kobayashi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 376 days.

(21) Appl. No.: 16/633,600

(22) PCT Filed: Aug. 16, 2018

(86) PCT No.: PCT/JP2018/030392
§ 371 (c)(1),
(2) Date: Jan. 24, 2020

(87) PCT Pub. No.: WO2019/044515
PCT Pub. Date: Mar. 7, 2019

(65) Prior Publication Data
US 2021/0156380 A1    May 27, 2021

(30) Foreign Application Priority Data

Aug. 31, 2017  (JP) .............................. JP2017-167893

(51) Int. Cl.
*H02K 3/52* (2006.01)
*H02K 11/33* (2016.01)
*F04C 15/00* (2006.01)

(52) U.S. Cl.
CPC .............. *H02K 3/52* (2013.01); *H02K 3/522* (2013.01); *H02K 11/33* (2016.01); *F04C 15/008* (2013.01);
(Continued)

(58) Field of Classification Search
CPC .... F04C 15/008; F04C 15/0057; F04C 2/102; F04C 2240/40; F04C 2240/803;
(Continued)

(56) References Cited

U.S. PATENT DOCUMENTS

2005/0012387 A1* 1/2005 Suzuki ................. F04C 15/008
                                                  303/116.4
2011/0254393 A1* 10/2011 Yamasaki ............... H02K 5/18
                                                  310/64

(Continued)

FOREIGN PATENT DOCUMENTS

JP    2012241565 A  * 12/2012
JP    2013-092126 A    5/2013
(Continued)

OTHER PUBLICATIONS

Hiratsuka et al., Electric Pump, Dec. 10, 2012, JP 2012241565 (English Machine Translation) (Year: 2012).*
Yamazaki Akihiro, Electric Pump, May 16, 2013, JP 2013092126 (English Machine Translation) (Year: 2013).*
Official Communication issued in International Patent Application No. PCT/JP2018/030392, dated Nov. 20, 2018.

*Primary Examiner* — Alexander A Singh
(74) *Attorney, Agent, or Firm* — Keating & Bennett

(57) ABSTRACT

An electric oil pump includes a motor including a shaft, a pump driven via the shaft, and an inverter assembly located on a rear side of the motor and secured to the motor. The motor includes a rotor, a stator, and a motor housing that houses the rotor and the stator. The pump includes a pump rotor and a pump housing. The motor housing has a bottomed tubular shape that includes a bottom portion on a side of the inverter assembly, and the inverter assembly includes an inverter housing including a circuit board housing that houses a circuit board and a busbar holder. The busbar holder is on a side opposite to a terminal that is electrically connected to the circuit board with respect to the shaft in the circuit board housing.

9 Claims, 7 Drawing Sheets

(52) U.S. Cl.
CPC ...... *F04C 2240/30* (2013.01); *F04C 2240/40* (2013.01); *F04C 2240/808* (2013.01); *H02K 2211/03* (2013.01)

(58) Field of Classification Search
CPC ... F04C 2240/30; F04D 29/528; H02K 5/225; H02K 5/22; H02K 11/33; H02K 11/30; H02K 11/00; H02K 3/522; H02K 3/52; H02K 7/14; H02K 1/276; H02K 2211/03; F04B 17/03
USPC .................................. 310/71, 68 D, 68 R
See application file for complete search history.

(56) References Cited

U.S. PATENT DOCUMENTS

2012/0286604 A1* 11/2012 Abe .................. H02K 11/33
310/71
2017/0324300 A1 11/2017 Yamashita

FOREIGN PATENT DOCUMENTS

| JP | 2013092126 A | * | 5/2013 |
| JP | 2015-204720 A | | 11/2015 |
| JP | 2016-100972 A | | 5/2016 |
| JP | 2016-226177 A | | 12/2016 |

* cited by examiner

ELECTRIC OIL PUMP

CROSS REFERENCE TO RELATED APPLICATIONS

This is a U.S. national stage of PCT Application No. PCT/JP2018/030392, filed on Aug. 16, 2018, and claiming priority under 35 U.S.C. § 119(a) and 35 U.S.C. § 365(b) to Japanese Application No. 2017-167893, filed Aug. 31, 2017, the entire disclosures of these applications being hereby incorporated herein by reference.

1. FIELD OF THE INVENTION

The present disclosure relates to an electric oil pump.

2. BACKGROUND

For example, Japanese Unexamined Patent Application Publication No. 2013-092126 discloses an electric oil pump in which an inverter assembly provided with a circuit board and an electric pump are integrated. The electric oil pump has an oil pump and the inverter assembly. The oil pump of the electric oil pump is inserted into a pump housing hole provided at a housing of a transmission, the inverter assembly is disposed along an outer surface of the housing on a side of a motor of the oil pump, and the oil pump and the inverter assembly are secured to the housing of the transmission via bolts.

Although Japanese Unexamined Patent Application Publication No. 2013-092126 describes the case in which the electric oil pump is secured to the inside of the transmission, there are also cases in which the electric oil pump is secured to the outside of the transmission. If the electric oil pump is secured to the outside of the transmission, the inverter assembly is brought into a cantilever supported state with respect to a position at which the electric oil pump is secured to the transmission. Therefore, there is a concern that if vibration generated by an engine or the like propagates to the electric oil pump via the transmission, then the inverter assembly at a position away from the secured position may vibrate more significantly than the vibration propagating to the electric oil pump. Therefore, there is a concern that a rib of an electronic component (for example, a capacitor) mounted on the circuit board may be disconnected.

Also, since the electric oil pump is placed in an existing space in a vehicle in the case in which the electric oil pump is secured to the outside of the transmission, there is a strict restriction for mounting the electric oil pump, and it is necessary to reduce the size of the electric oil pump in order to enable the placement thereof in various mounting spaces. In a case in which the inverter assembly is provided at the electric oil pump, in particular, it is necessary to further reduce the size thereof.

SUMMARY

Example embodiments of the present disclosure provide electric oil pumps each capable of alleviating the concern that electronic components mounted on a circuit board in an inverter assembly may be damaged by vibration in a case in which the electric oil pump provided with the inverter assembly is secured and capable of realizing size reduction.

According to an example embodiment of the present application, an electric oil pump includes a motor that includes a shaft extending in an axial direction with a central axis, a pump located on one side of the motor in the axial direction and driven by the motor via the shaft to eject oil, and an inverter assembly that is located on another side of the motor in the axial direction and is secured to the motor. The motor includes a rotor that is secured to the shaft on one side in the axial direction, a stator that is located outside the rotor in a radial direction, and a motor housing that houses the rotor and the stator. The pump includes a pump rotor that is attached to the shaft projecting on the one side in the axial direction from the motor, and a pump housing that includes a housing that houses the pump rotor. The motor housing has a bottomed tubular shape that includes a bottom portion on a side of the inverter assembly, the inverter assembly includes an inverter housing that includes a circuit board housing that houses a circuit board and a busbar holder, and the busbar holder is on a side opposite to a side of an external terminal that is electrically connected to the circuit board with respect to the shaft of the motor in the circuit board housing.

According to the example embodiment of the present application, it is possible to provide an electric oil pump capable of alleviating the concern that terminals of electronic components mounted on the circuit board in the inverter assembly will be damaged in a case in which the electric oil pump provided with the inverter assembly is secured and capable of realizing size reduction.

The above and other elements, features, steps, characteristics and advantages of the present disclosure will become more apparent from the following detailed description of the example embodiments with reference to the attached drawings.

DETAILED DESCRIPTION

Figure 1:
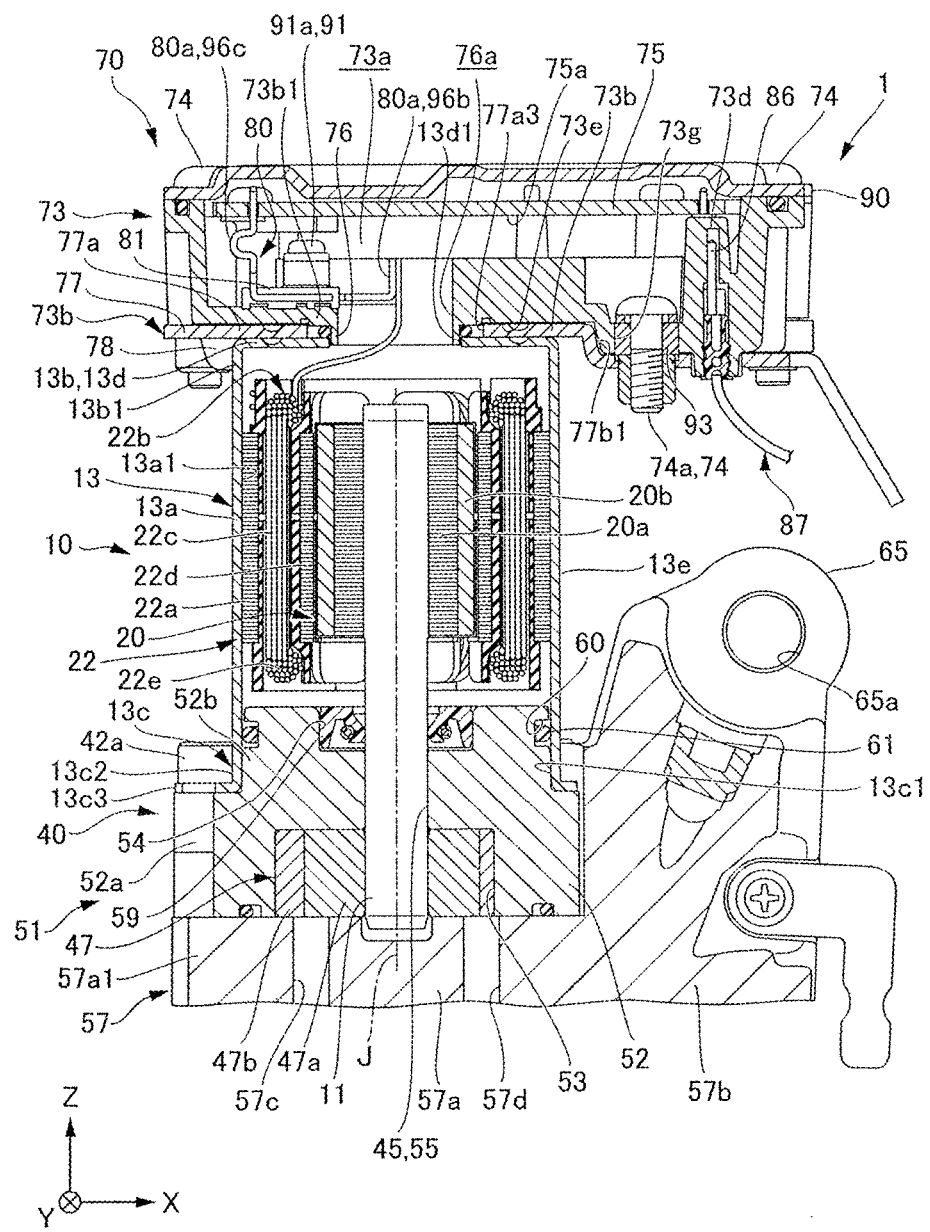
FIG. 1 is a sectional view of an electric oil pump according to a first example embodiment of the present disclosure.

Hereinafter, electric oil pumps according to example embodiments of the present disclosure will be described with reference to the drawings. Also, scales, numbers, and the like of the respective structures may be different from those of actual structures in the following drawings for easy understanding of the respective components.

In addition, an XYZ coordinate system will be appropriately illustrated as a three-dimensional orthogonal coordinate system in the drawings. A Z-axis direction in the XYZ coordinate system is defined as a direction that is parallel to the other direction in an axial direction of a central axis J illustrated in FIG. 1. An X-axis direction is defined as a direction that is parallel to a short-side direction of the electric oil pump illustrated in FIG. 1, that is, the left-right direction in FIG. 1. A Y-axis direction is a direction that perpendicularly intersects both the X-axis direction and the Z-axis direction.

Also, the positive side (+Z side) in the Z-axis direction will be referred to as a "rear side," and the negative side (−Z side) in the Z-axis direction will be referred to as a "front side" in the following description. Note that the rear side and the front side are names used only for explanation and do not limit actual positional relationships and directions. Also, the direction (Z-axis direction) that is parallel to the central axis J will simply be referred to as an "axial direction," a radial direction with the central axis J located at the center will simply be referred to as a "radial direction," and a circumferential direction with the central axis J located at the center, that is, around the central axis J (□ direction) will simply be referred to as a "circumferential direction" unless particularly indicated otherwise.

Note that extending in the axial direction in the specification includes not only a case of extending strictly in the axial direction (Z-axis direction) but also a case of extending in a direction inclined within a range of less than 45□ with respect to the axial direction. Also, extending in the radial direction in the specification includes not only a case of extending strictly in the radial direction, that is, a direction that perpendicularly intersects the axial direction (Z-axis direction), but also a case of extending in a direction inclined within a range of less than 45□ with respect to the radial direction.

First Example Embodiment

<Overall Configuration>

FIG. 1 is a sectional view of an electric oil pump according to a first example embodiment. The electric oil pump 1 according to the example embodiment includes a motor 10, a pump 40, and an inverter assembly 70 as illustrated in FIG. 1. The motor 10 and the pump 40 are disposed in the axial direction. The motor 10 includes a shaft 11 disposed along the central axis J extending in the axial direction. The pump 40 is located on one side (front side) of the motor 10 in the axial direction and is driven by the motor 10 via the shaft 11 to eject an oil. The inverter assembly 70 is located on the other side (rear side) of the motor 10 in the axial direction and is secured to the motor 10 via a base plate 77. Hereinafter, each configuration member will be described in detail.

<Motor 10>

The motor 10 includes a motor housing 13, a rotor 20, a shaft 11, and a stator 22 as illustrated in FIG. 1.

The motor 10 is an inner rotor-type motor, for example, a rotor 20 is secured to an outer circumferential surface of the shaft 11, and the stator 22 is located outside the rotor 20 in the radial direction.

(Motor Housing 13)

The motor housing 13 includes a stator holding portion 13a, an inverter holding portion 13b, and a pump body holding portion 13c. The motor housing 13 is made of a metal. The motor housing 13 has a bottomed tubular shape that has a bottom portion 13d on the side of the inverter assembly 70.

(Stator Holding Portion 13a)

The stator holding portion 13a extends in the axial direction and has a through-hole 13a1 therein. The shaft 11, the rotor 20, and the stator 22 of the motor 10 are disposed in the through-hole 13a1. An outer surface of the stator 22, that is, an outer surface of a core-back portion 22a, which will be described later, is fitted into an inner surface of the stator holding portion 13a. In this manner, the stator 22 is housed in the stator holding portion 13a.

(Inverter Holding Portion 13b)

The inverter holding portion 13b is a portion that is continuous with a rear-side end 13b1 of the stator holding portion 13a. In the example embodiment, the inverter holding portion 13b includes the rear-side end 13b1 of the stator holding portion 13a and the disk-shaped bottom portion 13d that extends inward in the radial direction from the rear-side end 13b1. A motor-side through-hole 13d1 that penetrates in the axial direction is provided at the center of the bottom portion 13d. A coil end insertion portion 76 that is provided to project from the bottom portion of the inverter assembly 70 on the front side is inserted into the motor-side through-hole 13d1. An inverter assembly-side through-hole 76a that penetrates in the axial direction is provided at the coil end insertion portion 76. The inverter assembly-side through-hole 76a establishes communication between the inside of the motor 10 and the inside of the inverter assembly 70. Details of the coil end insertion portion 76 will be described later.

The base plate 77 provided at an end of the inverter assembly 70 on the front side is placed on the bottom portion 13d of the motor housing 13, and the base plate 77 is welded to the bottom portion 13d. Therefore, the inverter assembly 70 is secured to the bottom portion 13d of the motor housing 13.

(Pump Body Holding Portion 13c)

The pump body holding portion 13c has a tubular shape opened on the front side and is continuous with an end of the stator holding portion 13a on the front side. A hole 13c1 extending in the axial direction is provided in the pump body holding portion 13c. The inner diameter of the hole 13c1 has a slightly larger dimension than the outer diameter of a pump body 52 of the pump 40, which will be described later, on the rear side. The pump body 52 on the rear side is fitted into the inner surface of the hole 13c1.

Motor-side flange portions 13c3 projecting in the radial direction are provided at an outer surface 13c2 of the pump body holding portion 13c. The motor-side flange portions 13c3 are disposed to face pump-side flange portions 52a provided at the pump body 52, which will be described later, and are secured to the pump-side flange portions 52a with securing fasteners such as bolts 42a. In this manner, the pump 40 is secured to the motor housing 13.

(Rotor 20)

The rotor 20 includes a rotor core 20a and a rotor magnet 20b. The rotor core 20a surrounds the shaft 11 around the axis (□ direction) and is secured to the shaft 11. The rotor magnet 20b is secured to the outer surface of the rotor core 20a around the axis (□ direction). The rotor core 20a and the rotor magnet 20b rotate along with the shaft 11. Note that the rotor 20 may be of a built-in magnet type in which a permanent magnet is incorporated in the rotor 20. The built-in magnet-type rotor 20 can reduce a concern of the magnet peeling off due to a centrifugal force and can actively take advantage of a reluctance torque as compared with a surface magnet type in which a permanent magnet is provided on the surface of the rotor 20.

(Stator 22)

The stator 22 surrounds the rotor 20 around the axis (□ direction) and causes the rotor 20 to rotate about the central axis J. The stator 22 includes a core-back portion 22a, tooth portions 22c, a coil 22b, and an insulator (bobbin) 22d.

The shape of the core-back portion 22a is a cylindrical shape that is coaxial with the shaft 11. The tooth portions 22c extend from the inner surface of the core-back portion 22a toward the shaft 11. A plurality of tooth portions 22c are provided and disposed at equal intervals in the circumferential direction of the inner surface of the core-back portion 22a. The coil 22b is provided in the surroundings of the insulator (bobbin) 22d and is obtained by a conductive wire 22e being wound therearound. The insulator (bobbin) 22d is attached to each tooth portion 22c.

(Shaft 11)

The shaft 11 extends along the central axis J and penetrates through the motor 10 as illustrated in FIG. 1. The shaft 11 on the front side (−Z side) projects from the motor 10 and extends toward the inside of the pump 40. The shaft 11 on the rear side (+Z side) projects from the rotor 20 and serves as a free end. Therefore, the rotor 20 is brought into a cantilever supported state in which the shaft 11 on the front side is supported by a sliding bearing 45, which will be described later.

(Inverter Assembly 70)

The inverter assembly 70 includes an inverter housing 73 and a cover portion 90.

Figure 2:
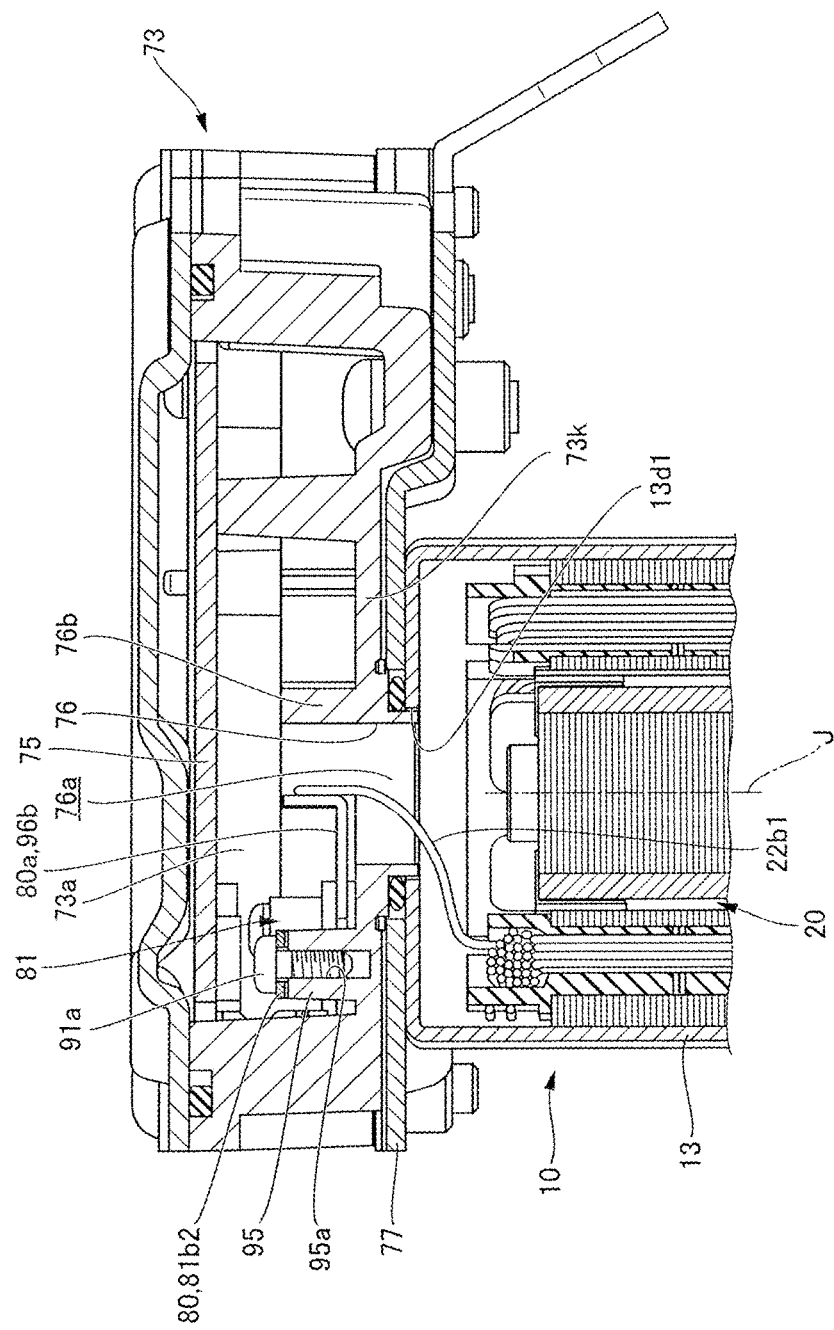
FIG. 2 is a sectional view of an inverter housing according to the first example embodiment of the present disclosure.
Figure 3:
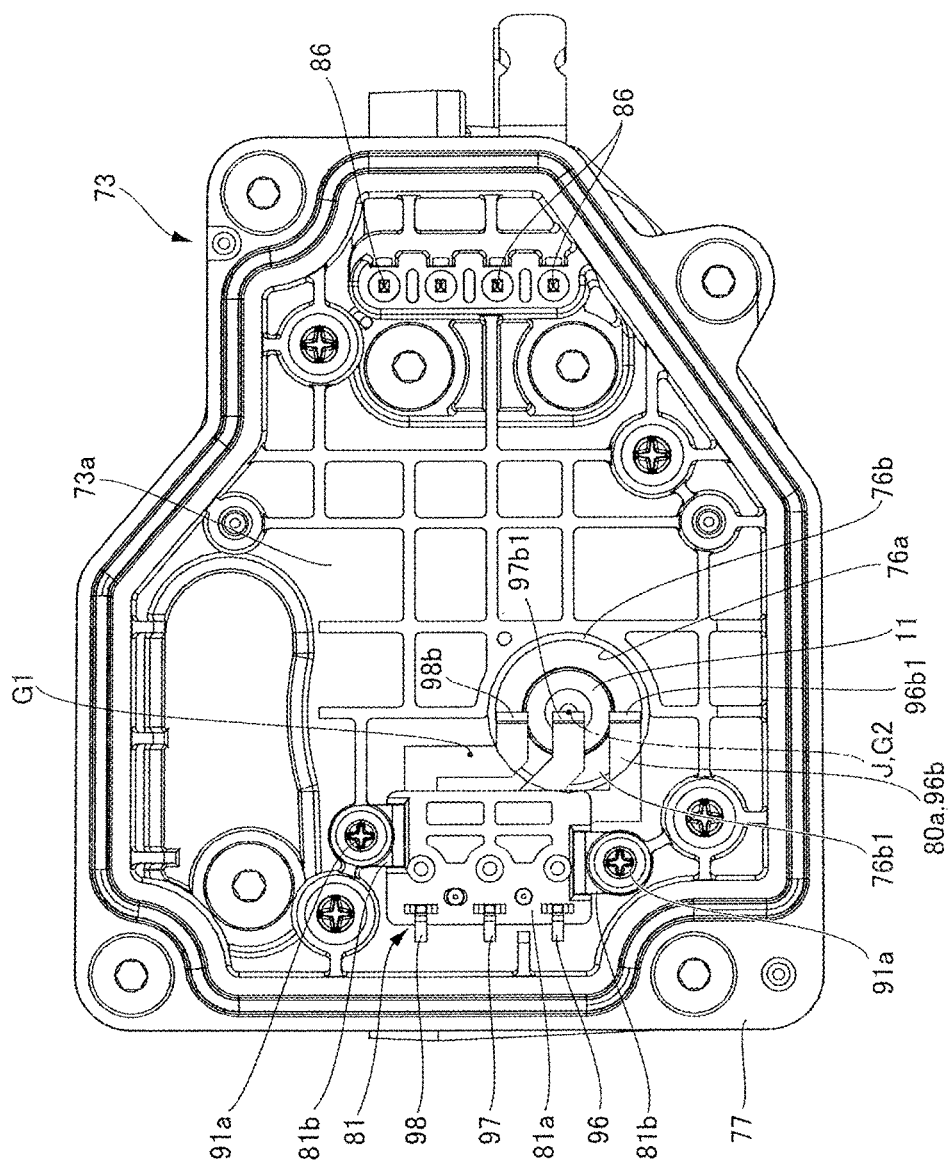
FIG. 3 is a plan view of the inverter housing from a rear side according to the first example embodiment of the present disclosure.

FIG. 2 is a sectional view of the inverter housing 73 according to the first example embodiment. FIG. 3 is a plan view of the inverter housing 73 from the rear side according to the first example embodiment. The inverter housing 73 is an integrally molded article made of a resin. The inverter housing 73 has a bottomed container shape that has a circuit board housing 73a that is opened on the rear side and is recessed on the front side and that extends in the X-axis and Y-axis directions, as illustrated in FIGS. 2 and 3. The inverter assembly-side through-hole 76a extending coaxially with the central axis J is provided at an end wall portion 73k of the circuit board housing 73a of the inverter housing 73 on the front side. The inverter assembly-side through-hole 76a is provided inside a tubular wall portion 76b extending from the end wall portion 73k to both sides in the axial direction. The wall portion 76b on the rear side projects further forward than the end wall portion 73k and extends to the inside of the motor-side through-hole 13d1 provided in the bottom portion 13d of the motor housing 13.

Meanwhile, the wall portion 76b on the rear side extends further backward than the end wall portion 73k and extends to a position corresponding to substantially half of the depth of the circuit board housing 73a in the axial direction. Also, a notch portion 76b1 into which busbar terminals 80a of busbars 80 can be inserted is provided at a wall portion 76b on the side on which the busbar holder 81 is disposed on the rear side of the wall portion 76b. Coil ends 22b1 extending from the motor 10 are connected to the busbar terminals 80a through the inverter assembly-side through-hole 76a. Therefore, since the coil ends 22b1 pass through the inside of the wall portion 76b made of a resin, it is possible to maintain insulation of the coil ends 22b1.

Figure 4:
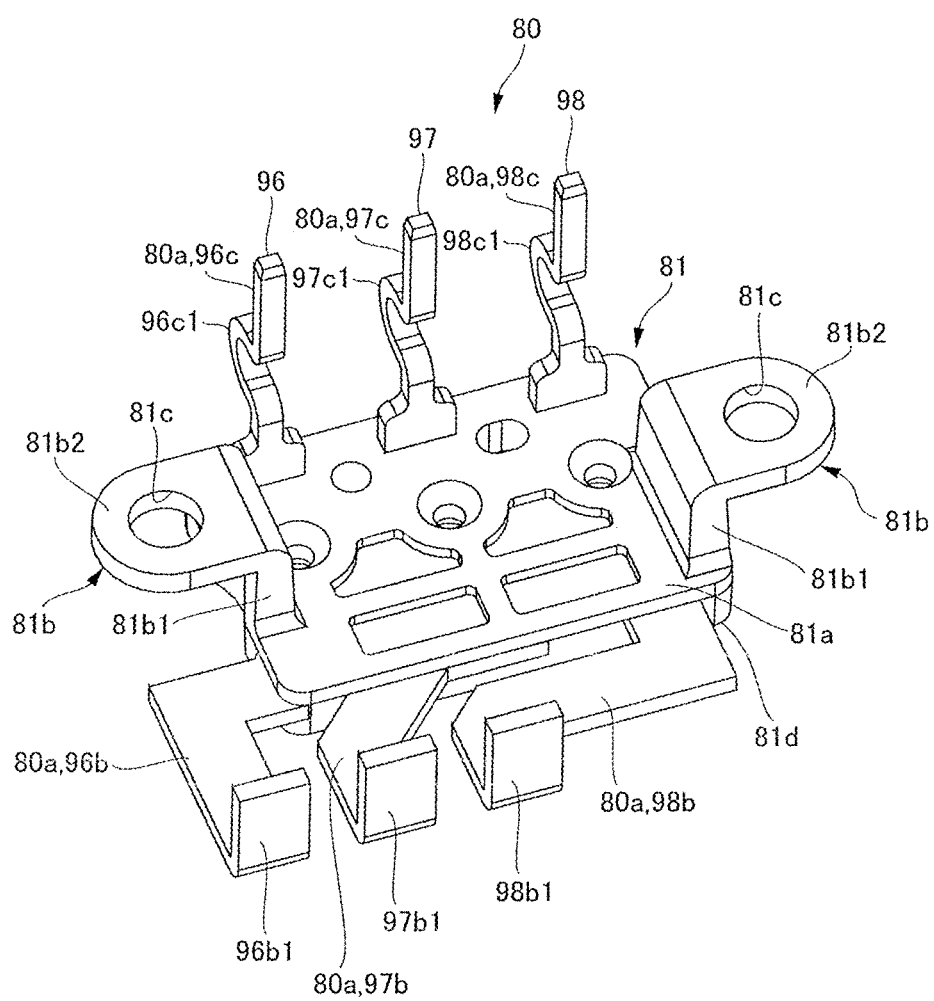
FIG. 4 is a perspective view of a busbar holder provided with busbars according to the first example embodiment of the present disclosure.
Figure 5:
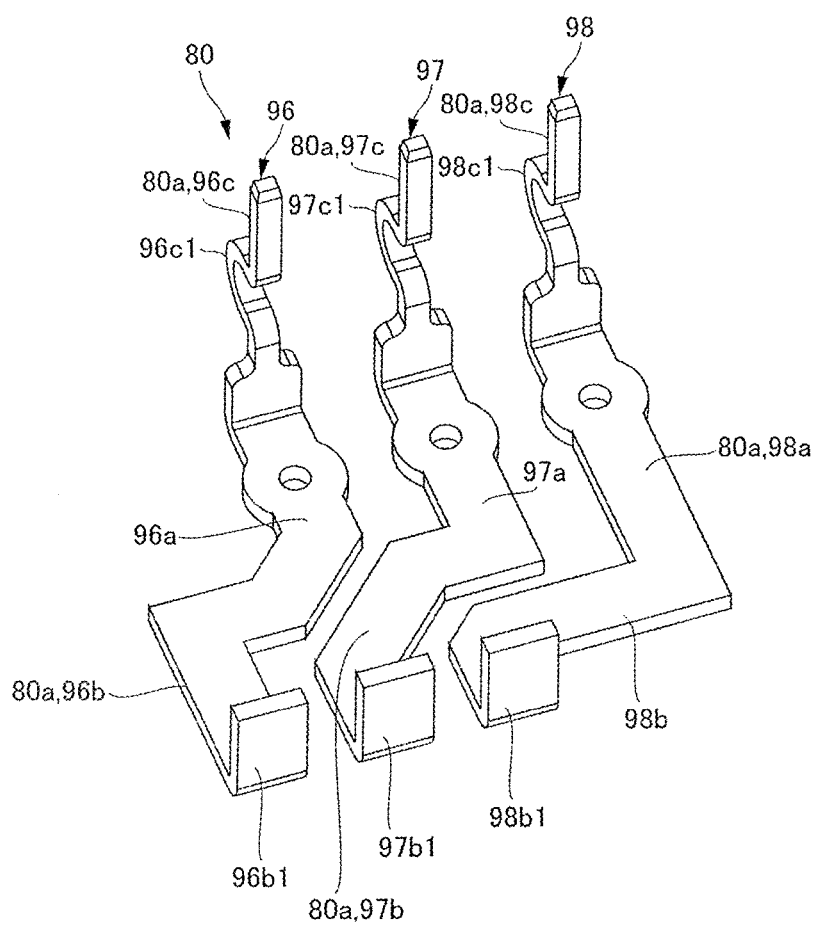
FIG. 5 is a perspective view of the busbar according to the first example embodiment of the present disclosure.

FIG. 4 is a perspective view of the busbar holder 81 that includes the busbars 80 according to the first example embodiment. FIG. 5 is a perspective view of the busbars 80 according to the first example embodiment. As illustrated in FIG. 4, the busbar holder 81 and the busbars 80 are an integrally molded article made of a resin. The busbar holder 81 is disposed on the side opposite to the side of the terminal 86 (the side of the external terminal) that is electrically connected to the circuit board 75 with respect to the shaft 11 of the motor 10 in the circuit board housing 73a as illustrated in FIG. 3. In the example embodiment, the busbar holder 81 is disposed further leftward than the inverter assembly-side through-hole 76a in the X-axis direction. The busbar holder 81 includes a recessed holder main body portion 81a that is recessed from one end side to the other end side and a secured portion 81b that projects further outward than the width between both ends of the holder main body portion 81a from the end of the holder main body portion 81a on the one end side. The holder main body portion 81a is disposed in the circuit board housing 73a such that a recessed end 81d on the side on which the holder main body portion 81a is recessed in the recessed shape is directed to the side of the motor 10.

In the example embodiment, the holder main body portion 81a has a rectangular parallelepiped shape as illustrated in FIG. 4. The secured portion 81b includes leg portions 81b1 extending from both ends of the holder main body portion 81a in the longitudinal direction to the rear side and flange portions 81b2 bent from the ends of the leg portions 81b1 on the rear side and extending further outward than the width between both ends of the holder main body portion 81a in the longitudinal direction. Through-holes 81c that penetrate in the axial direction are provided at the flange portions 81b2. Securing fasteners 91 such as bolts 91a (see FIG. 3) are inserted into the through-holes 81c.

Projecting portions 95 projecting on the rear side are provided at the bottom portion of the circuit board housing 73a as illustrated in FIGS. 2 and 3. In the example embodiment, the projecting portions 95 are provided at two positions located further leftward than the inverter assembly-side through-hole 76a in the X-axis direction and on one side and the other side in the Y-axis direction with respect to the central axis J. The two projecting portions 95 are disposed with a deviation on the positive side in the Y-axis direction with respect to the central axis J. Distal ends of the projecting portions 95 on the rear side are located at a height corresponding to substantially half of the height of the circuit board housing 73a in the axial direction. Female screw portions 95a opened at the distal ends and extending on the front side are provided at the projecting portions 95. The flange portions 81b2 are fastened by the securing fasteners 91 such as bolts 91a being screwed into the female screw portions 95a.

As the busbars 80 in the example embodiment, three busbars 80 are disposed at intervals in the longitudinal direction of the busbar holder 81 as illustrated in FIGS. 4 and 5. In the example embodiment, the busbars 80 include a first busbar 96, a second busbar 97, and a third busbar 98. Note that, since these three busbars, namely the first busbar 96, the second busbar 97, and the third busbar 98, have substantially similar configurations, the first busbar 96 will be described, corresponding reference numerals will be given to the second busbar 97 and the third busbar 98, and description thereof will be omitted.

The first busbar 96 is secured to the holder main body portion 81a and extends in the short-side direction (X-axis direction) of the holder main body portion 81a. The first busbar 96 includes a first busbar main body portion 96a that is secured to the holder main body portion 81a and extends in the short-side direction of the holder main body portion 81a. Busbar terminals 80a are provided on both sides of the first busbar main body portion 96a. The busbar terminal 80a on one end side of the first busbar main body portion 96a includes a coil end connecting portion 96b extending rightward in the X-axis direction. The right end of the coil end connecting portion 96b in the X-axis direction includes a coupling portion 96b1 that is bent and extends on the rear side and is then connected to the coil ends 22b1. The coupling portion 96b1 is located inside the inverter assembly-side through-hole 76a as illustrated in FIG. 3. In the example embodiment, the coupling portion 96b1 is disposed at a position on an inner diameter of the inverter assembly-side through-hole 76a.

The busbar terminal 80a on the other end side of the first busbar main body portion 96a includes a circuit board connecting portion 96c extending toward the front side as illustrated in FIG. 5. A bent portion 96c1 that is bent leftward in the X-axis direction is provided at the center of the circuit board connecting portion 96c in an extending direction. An end of the circuit board connecting portion 96c on the rear side is connected to the circuit board 75.

A gravity center position G1 of the inverter assembly 70 is located at a position deviated from a gravity center position G2 of the motor 10 when the inverter assembly 70 is seen from the rear side to the front side as illustrated in FIG. 3. In the example embodiment, the gravity center position G2 of the motor 10 is located on the central axis J of the shaft 11. Meanwhile, the gravity center position G1 of the inverter assembly 70 is located at a position deviated on the positive side in the Y-axis direction relative to the gravity center position G2 of the motor 10. Therefore, there is a concern of the securing of the inverter assembly 70 with respect to the motor 10 becoming unstable. Thus, the inverter assembly 70 is fixedly secured to the motor 10 via the base plate 77. Details of the base plate 77 will be described later.

The terminal 86 is a terminal disposed on the right side in the X-axis direction in the circuit board housing 73a and is provided at an end of an external cable 87 on one side as illustrated in FIG. 1. The terminal 86 is attached to the inside of the circuit board housing 73a and is electrically connected to the circuit board 75.

The circuit board 75 outputs a motor output signal. The circuit board 75 is disposed on the rear side of the circuit board housing 73a and extends in a direction that intersects the axial direction. In the example embodiment, the circuit board 75 extends in the X-axis direction that perpendicularly intersects the axial direction. A side surface of the circuit board 75 on the front side (front side surface 75a) is provided with a print wiring, which is not illustrated. Also, a plurality of electronic components are mounted on the front side surface 75a of the circuit board 75. It is possible to discharge heat generated by a heat generating element, which is not illustrated, via a cover portion using a Cu-inlay substrate as the circuit board 75.

Figure 6:
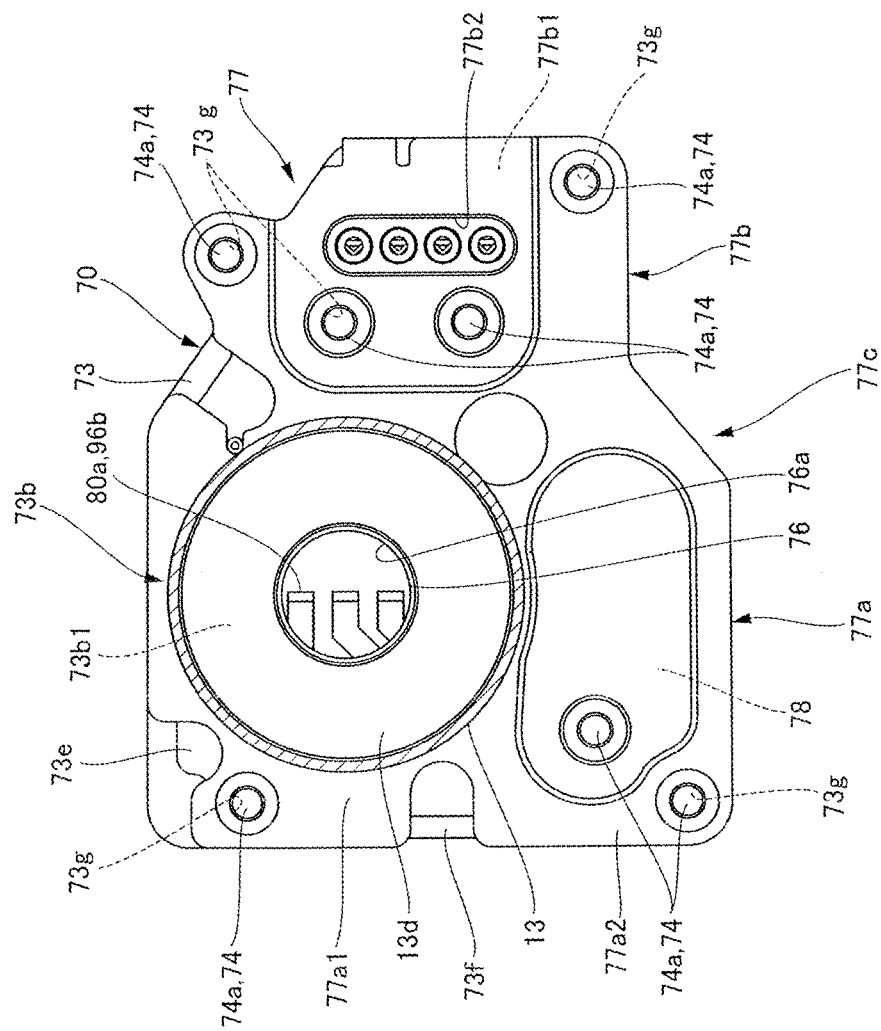
FIG. 6 is a bottom view of a base plate from a front side according to the first example embodiment of the present disclosure.

FIG. 6 is a bottom view of the base plate 77 from the front side according to the example embodiment. As illustrated in FIGS. 1 and 6, the inverter housing 73 on the front side includes an inverter housing secured portion 73b that is secured to the bottom portion 13d of the motor housing 13 via the base plate 77. The inverter housing secured portion 73b includes a plate-shaped secured surface portion 73b1 extending along the bottom portion 13d. In the example embodiment, the inverter housing secured portion 73b has a disk shape when seen in the axial direction. The busbar holder 81 provided with the busbars 80 is fastened to the secured surface portion 73b1.

The inverter housing 73 includes the base plate 77 on the front side. The base plate 77 is made of a metal and extends along a bottom surface 73e of the inverter housing 73 on the front side. The base plate 77 has a shape that is similar to and larger than the shape of the bottom surface 73e of the inverter housing 73 on the front side and covers the bottom surface 73e. The base plate 77 includes a first base plate 77a provided with a secured surface portion 73b1 and a second base plate 77b extending on the positive side in the X-axis direction from an end of the first base plate 77a on the positive side in the X-axis direction.

The first base plate 77a includes a secured main body portion 77a1 that is secured to the bottom portion 13d of the motor housing 13 and an extending portion 77a2 extending on the positive side in the Y-axis direction from an end of the secured main body portion 77a1 on the positive side in the Y-axis direction. A hole 77a3 that communicates with the motor-side through-hole 13d1 opened in the bottom portion 13d of the motor housing 13 is provided at the center of the secured main body portion 77a1. The secured main body portion 77a1 is placed on a plane-shaped bottom portion 13d of the motor housing 13 in a state in which the hole 77a3 communicates with the motor-side through-hole 13d1 and is secured to the bottom portion 13d through welding (spot welding, for example).

An electronic component disposition recessed portion 78 that is opened on the rear side and is recessed on the front side is provided at the extending portion 77a2. The electronic component disposition recessed portion 78 is located outside the motor housing 13 in the radial direction. The electronic component disposition recessed portion 78 has a long circular shape that has a predetermined width in the Y-axis direction and extends in the X-axis direction. The predetermined width of the electronic component disposition recessed portion 78 is a size with which relatively large-sized electronic components, such as a capacitor and a choke coil, can be inserted thereinto.

The second base plate 77b includes an external terminal attachment recessed portion 77b1 that is recessed from the rear side to the front side. The external terminal attachment recessed portion 77b1 is opened on the rear side and the positive side in the X-axis direction. A hole 77b2 extending in the Y-axis direction is provided at the center of the external terminal attachment recessed portion 77b1. The hole 77b2 causes an end of an external terminal receiving portion 73d provided at the inverter housing 73 on the front side to be exposed. The external terminal receiving portion 73d is provided in the inverter housing 73 on a side further backward than the external terminal attachment recessed portion 77b1. Note that, although the base plate 77 has a plate shape, rigidity thereof is enhanced by the electronic component disposition recessed portion 78 and the external terminal attachment recessed portion 77b1 being provided.

The inverter housing 73 is secured to the base plate 77 via securing fasteners 74 such as bolts 74a. In the example embodiment illustrated in the drawing, the inverter housing 73 is fastened and secured via the securing fasteners 74 between the electronic component disposition recessed portion 78 and the bottom surface 73e of the inverter housing 73 on the front side and between the external terminal attachment recessed portion 77b1 and the bottom surface 73e of the inverter housing 73 on the front side in a state in which the first base plate 77a of the base plate 77 is in contact with the bottom surface 73e of the inverter housing 73 on the front side. Note that securing fastener through-holes 73g that penetrate in the axial direction for allowing the securing fasteners 74 to pass therethrough are provided at the inverter housing 73. Also, the inverter housing 73 is secured to the base plate 77 via the securing fasteners 74 that are caused to pass through four corners of the cover portion 90 and the inverter housing 73.

Incidentally, since the inverter housing 73 is made of a resin, there is a concern that the inverter housing 73 is damaged if the inverter housing 73 is fastened directly with the securing fasteners 74. Therefore, the securing fasteners 74 are caused to pass through collars 93 made of metal, and the inverter housing 73 is secured to the base plate 77 via the collars 93.

<Pump 40>

The pump 40 is located on one side of the motor 10 in the axial direction, more specifically, on the front side (−Z side) as illustrated in FIG. 1. The pump 40 is driven by the motor 10 via the shaft 11. The pump 40 includes a pump rotor 47 and a pump housing 51. The pump housing 51 includes a pump body 52 and a pump cover 57. Hereinafter, the respective components will be described in detail.

(Pump Body 52)

On the front side (−Z side) of the motor 10, the pump body 52 is secured in the motor housing 13 on the front side (−Z side). The pump body 52 includes a recessed portion 54 that is recessed from a surface on the rear side (+Z side) to the front side (−Z side). A sealing member 59 is housed in the recessed portion 54. The pump body 52 includes a housing 53 that houses the pump rotor 47 and has a side surface and a bottom surface located on the rear side (+Z side) of the pump 40. The housing 53 is opened on the front side (−Z side) and is recessed on the rear side (+Z side). The shape of the housing 53 when seen in the axial direction is a circular shape.

The pump cover 57 is provided with the housing 53 with the pump body 52 therebetween by covering the pump body 52 from the front side (−Z side). An annular recessed portion 60 that is recessed inward in the radial direction is provided in an outer surface 52b of the pump body 52 on the rear side. A sealing member 61 (for example, an O ring) is inserted into the recessed portion 60.

The pump body 52 includes a through-hole 55 that penetrates along the central axis J. The through-hole 55 is opened at both ends in the axial direction, the shaft 11 is caused to pass therethrough, the opening on the rear side (+Z side) is opened in the recessed portion 54, and the opening on the front side (−Z side) is opened in the housing 53. The through-hole 55 functions as the sliding bearing 45 that rotatably supports the shaft 11.

The pump-side flange portions 52a are provided at an outer end of the pump body 52 in the radial direction. The plurality of pump-side flange portions 52a are provided at intervals in the circumferential direction.

(Pump Cover 57)

The pump cover 57 includes a pump cover main body portion 57a attached to the pump body 52 on the front side and a pump cover arm portion 57b that extends from an end of the pump cover main body portion 57a on one side in the radial direction toward the side of the motor 10, as illustrated in FIG. 1.

Pump cover-side flange portions 57a1 are provided at an outer end of the pump cover main body portion 57a in the radial direction. The plurality of pump-cover side flange portions 57a1 are provided at intervals in the circumferential direction. Female screws into which the bolts 42a can be screwed are provided at the pump cover-side flange portions 57a1.

It is possible to secure the motor 10 to the pump 40 by the motor-side flange portion 13c3 and the pump-side flange portions 52a being disposed so as to overlap with each other on the pump cover-side flange portions 57a1 and the bolts 42a caused to pass through the motor-side flange portion 13c3 and the pump-side flange portions 52a being fastened to the female screws provided in the pump cover-side flange portions 57a1.

The pump cover arm portion 57b extends on the rear side of the motor 10 along the outer surface 13e of the motor housing 13 from an outer end of the pump cover main body portion 57a on one side in the radial direction. The pump cover arm portion 57b is formed into a rectangular parallelepiped shape to enhance rigidity. A secured pump secured portion 65 is provided at an end of the pump cover arm portion 57b on the rear side. In the example embodiment, the pump secured portion 65 is secured to a transmission, for example. The pump secured portion 65 has a box shape and includes a securing hole 65a penetrating in the Y-axis direction. A securing fastener such as a bolt is inserted into the securing hole 65a, and the pump secured portion 65 is fixedly secured to a secured object such as a transmission.

Note that although the example in which the housing 53 that houses the pump rotor 47 is provided at the pump body 52 has been described in the example embodiment, the example embodiment is not limited thereto. The housing 53 may be provided at the pump cover 57.

(Pump Rotor 47)

The pump rotor 47 is attached to the shaft 11. More specifically, the pump rotor 47 is attached to the shaft 11 on the front side (−Z side). The pump rotor 47 includes an inner rotor 47a attached to the shaft 11 and an outer rotor 47b that surrounds the outside of the inner rotor 47a in the radial direction. The inner rotor 47a has an annular shape. The inner rotor 47a is a gear that has teeth on an outer surface in the radial direction.

The inner rotor 47a is secured to the shaft 11. More specifically, an end of the shaft 11 on the front side (−Z side) is pressure-fitted into the inner rotor 47a. The inner rotor 47a rotates about the axis (□ direction) along with the shaft 11. The outer rotor 47b has an annular shape surrounding the outside of the inner rotor 47a in the radial direction. The outer rotor 47b is a gear that has teeth on an inner surface in the radial direction.

The inner rotor 47a and the outer rotor 47b are engaged with each other, and the outer rotor 47b rotates due to rotation of the inner rotor 47a. That is, the pump rotor 47 rotates due to the rotation of the shaft 11. In other words, the motor 10 and the pump 40 have the same rotation axis. In this manner, it is possible to curb an increase in size of the electric oil pump 1 in the axial direction.

Also, a volume between engaged portions of the inner rotor 47a and the outer rotor 47b changes by the inner rotor 47a and the outer rotor 47b rotating. A region in which the volume decreases serves as a pressurization region, and a region in which the volume increases serves as a negative pressure region. An inlet port is disposed on the rear side (+Z side) of the negative pressure region of the pump rotor 47. Also, an ejection port is disposed on the rear side (+Z side) of the pressurization region of the pump rotor 47. Here, an oil suctioned from an inlet 57c provided at the pump cover 57 into the housing 53 is housed in the volume portion between the inner rotor 47a and the outer rotor 47b and is fed to the pressurization region. Thereafter, the oil is ejected from an outlet 57d provided at the pump cover 57 through the ejection port.

<Effects and Advantages of Electric Oil Pump 1>

Next, effects and advantages of the electric oil pump 1 will be described. As illustrated in FIG. 1, if the motor 10 of the electric oil pump 1 is driven, then the shaft 11 of the motor 10 rotates, and the outer rotor 47b also rotates along with the rotation of the inner rotor 47a of the pump rotor 47. If the pump rotor 47 rotates, then the oil suctioned from the inlet 57c of the pump 40 moves inside the housing 53 of the pump 40 and is then ejected from the outlet 57d through the ejection port.

(1) Here, the busbar holder 81 of the electric oil pump according to the example embodiment is disposed on the side opposite to the side of the terminal 86 (the side of the external terminal) that is electrically connected to the circuit board 75 with respect to the shaft 11 of the motor 10 in the circuit board housing 73*a* as illustrated in FIG. 3. Therefore, the region that the busbar holder 81 occupies in the circuit board housing 73*a* is reduced, and it is thus possible to reduce the size of the inverter assembly 70, as compared with a case in which the busbar holder 81 is disposed in the surroundings of the shaft 11.

(2) Also, since the busbar terminals 80*a* (coil end connecting portions 96*b*) of the busbar holder 81 extend to the inverter assembly-side through-hole 76*a*, it is possible to easily connect the coil ends 22*b*1 to the busbar terminals 80*a* (coil end connecting portions 96*b*).

(3) Also, it is possible to dispose the secured portion 81*b* on the projecting portion 95 and to secure the secured portion 81*b* to the projecting portion 95 via the securing fasteners 91 as illustrated in FIG. 2. Also, since the projecting portion 95 has a length in the projecting direction, it thus becomes easy to attach the secured portion 81*b* to the projecting portion 95 using the securing fasteners 91. Therefore, it is possible to easily secure the busbar holder 81 to the inside of the inverter housing 73.

(4) Also, since the securing fasteners 91 are male screws, it is possible to provide female screws into which the male screws are screwed at the projecting portion 95.

(5) In addition, since the coil end connecting portions 96*b* are located above the opening of the inverter assembly-side through-hole 76*a* on the side of the inverter assembly 70 as illustrated in FIG. 3, it is possible to easily connect the coil ends 22*b*1 extending from the motor 10 and passing through the inside of the inverter assembly-side through-hole 76*a*. Also, since the circuit board connecting portion 96*c* includes the bent portion 96*c*1 as illustrated in FIGS. 1 and 4, it is possible to cause deformation due to an external force to concentrate on the bent portion 96*c*1 in a case in which the external force acts on the circuit board connecting portion 96*c* when the circuit board connecting portion 96*c* is connected to the circuit board 75. Therefore, it is possible to alleviate a stress generated at the circuit board connecting portion 96*c* except for the bent portion 96*c*1. Also, if a heat is delivered to the circuit board connecting portion 96*c* in a case in which the circuit board connecting portion 96*c* is connected to the circuit board 75 through soldering or the like, the circuit board connecting portion 96*c* is likely to be stretched. However, the stretching of the circuit board connecting portion 96*c* is restricted by the circuit board 75. However, since the stretching of the circuit board connecting portion 96*c* concentrates on the bent portion 96*c*1, it is possible to alleviate a thermal stress generated at the circuit board connecting portion 96*c* except for the bent portion 96*c*1.

(6) Also, since the busbar holder 81 and the busbars 80 are integrally molded article made of a resin, it is possible to provide the busbar holder 81 and the busbars 80 in a state in which the busbars 80 are positioned with high precision with respect to the busbar holder 81.

(7) In addition, the inverter assembly 70 includes the base plate 77 that is disposed on one side of the inverter housing 73 in the axial direction, is widened in the radial direction, and is made of metal, and the base plate 77 is secured to the bottom portion 13*d* of the motor housing 13 of the motor 10. Therefore, rigidity of the inverter assembly 70 can be enhanced by the base plate 77. Also, it is possible to fixedly secure the inverter assembly 70 to the inverter housing 73 with the base plate 77.

(8) Also, the gravity center position G1 of the inverter assembly 70 is located at a position deviated from the gravity center position G2 of the motor 10 when the inverter assembly 70 is seen from the other side in the axial direction to the one side in the axial direction as illustrated in FIG. 3. In a case in which the electric oil pump 1 is provided at a transmission, for example, the disposition of the electric oil pump 1 is limited in accordance with requirements such as a size reduction of the transmission in some cases. In such cases, the gravity center position G2 of the motor 10 and the gravity center position G1 of the inverter assembly 70 are not disposed on the same straight line in some cases if optimal disposition of the electric oil pump 1 provided with the inverter assembly 70 with respect to the transmission is taken into consideration. Thus, it is possible to realize optimal disposition of the electric oil pump 1 with respect to the transmission to which the electric oil pump 1 is secured by disposing the gravity center position G1 of the inverter assembly 70 at the position deviated from the gravity center position G2 of the motor 10. Also, since the inverter assembly 70 is fixedly secured to the inverter housing 73 via the base plate 77, it is possible to curb an increase in vibration delivered from the motor 10 even if the gravity center position G1 of the inverter assembly 70 is deviated from the gravity center position G2 of the motor 10.

Modification Example of First Example Embodiment

Figure 7:
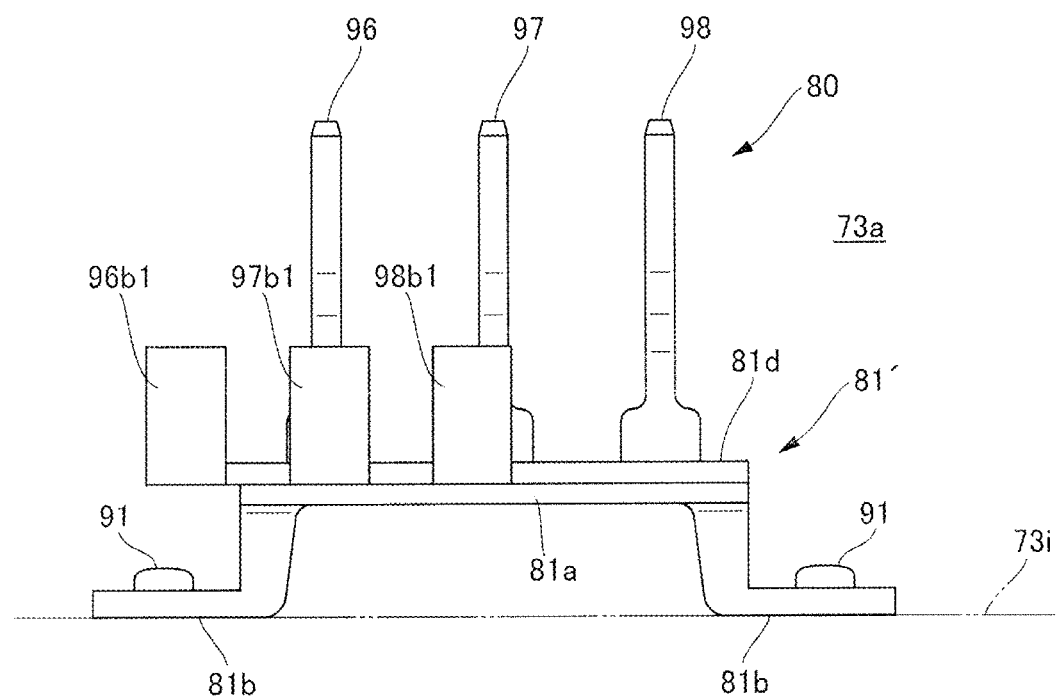
FIG. 7 is a front view of a modification example of the busbar holder provided with the busbars according to the first example embodiment of the present disclosure.

FIG. 7 is a side view of a modification example of the busbar holder 81 provided with the busbars 80 according to the first example embodiment. The case in which the recessed end 81*d* of the busbar holder 81 is directed to the side of the motor 10 has been described above, the recessed end 81*d* may be directed to the side of the bottom portion 13*d*.

As illustrated in FIG. 7, a busbar holder 81' according to the modification example includes a holder main body portion 81*a* that is recessed from one side to the other side in the axial direction and a secured portion 81*b* that projects with a width between both ends of the holder main body portion 81*a* from an end of the holder main body portion 81*a* on one end side. The holder main body portion 81*a* is disposed in the circuit board housing 73*a* such that a recessed end 81*d* recessed in a recessed shape is directed to the one side in the axial direction. The secured portion 81*b* is disposed on a bottom portion 73*i* of a circuit board housing 73*a* and is secured to the bottom portion 73*i* via securing fasteners.

In the modification example, the holder main body portion 81*a* is disposed in the circuit board housing 73*a* such that the recessed end 81*d* recessed in a recessed shape is directed to the one side in the axial direction, and the secured portion 81*b* is disposed on the bottom portion 73*i* of the circuit board housing 73*a* and is secured to the bottom portion 73*i* via the securing fasteners 91. Therefore, it is possible to dispose the secured portion 81*b* on the bottom portion 73*i* and to secure the secured portion 81*b* to the bottom portion 73*i* via the securing fasteners 91. Also, since the recessed end 81*d* is directed to the one side in the axial direction, there is no concern that the recessed end 81*d* comes into contact with the bottom portion 73*i*. Therefore, it is possible to easily bring the secured portion 81*b* into contact with the bottom portion 73*i*.

Also, the securing fasteners 91 may be male screws. In the modification example, it is possible to provide female screws into which the male screws are screwed in the bottom portion 73*i* by providing male screws as the securing fasteners 91.

Although a preferred example embodiment of the disclosure has been described above, the present disclosure is not limited to the example embodiment, and various modifications and changes can be made within the gist thereof. The example embodiment and the modification thereof are included in the scope and the gist of the present disclosure and are also included in the disclosure described in the claims and a scope equivalent thereto.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric oil pump comprising:
   a motor that includes a shaft extending in an axial direction with a central axis;
   a pump that is located on one side of the motor in the axial direction and is driven by the motor via the shaft to eject an oil; and
   an inverter assembly that is located on another side of the motor in the axial direction and is secured to the motor; wherein
   the motor includes:
      a rotor that is secured to the shaft on a side in the axial direction;
      a stator that is located outside the rotor in a radial direction; and
      a motor housing that houses the rotor and the stator;
   the pump includes:
      a pump rotor that is attached to the shaft projecting on one side in the axial direction from the motor; and
      a pump housing that includes a housing that houses the pump rotor;
   the motor housing has a bottomed tubular shape that includes a bottom portion on a side of the inverter assembly;
   a through-hole that penetrates along the central axis of the shaft is provided at the bottom portion of the motor housing and an end of the inverter housing on the one side in the axial direction;
   the inverter assembly includes an inverter housing that includes a circuit board housing that houses a circuit board and a busbar holder;
   the busbar holder is on a side opposite to a side of an external terminal that is electrically connected to the circuit board with respect to the shaft of the motor in the circuit board housing;
   the busbar holder includes a busbar terminal extending to the through-hole;
   a coil end extending from the stator of the motor is electrically connected to the busbar terminal through the through-hole;
   the busbar holder includes:
      a holder main body portion with a recessed shape that is recessed from one end side to another end side; and
      a secured portion that projects farther outward than a width between two ends of the holder main body portion from an end of the holder main body portion on the one end side;
   the holder main body portion is in the circuit board housing such that a recessed end on a side in which the holder main body portion is recessed in the recessed shape is directed to a side of the motor; and
   the secured portion is on a projecting portion that projects from a bottom portion of the circuit board housing to the another side in the axial direction and is secured to the projecting portion via a securing fastener.

2. The electric oil pump according to claim 1, wherein the securing fastener is a male screw.

3. The electric oil pump according to claim 1, wherein the bulbar terminal includes:
   a coil end connecting portion that extends above an opening of the through-hole on a side of the inverter assembly from the bottom portion of the holder main body portion toward a side of the through-hole; and
   a circuit board connecting portion that extends from a side opposite to the side of the through-hole at the bottom portion of the holder main body portion toward the another side in the axial direction;
   the circuit board connecting portion includes a bent portion that is bent in a direction that intersects the axial direction;
   the coil end connecting portion is connected to the coil end; and
   the circuit board is connected to the circuit board connecting portion.

4. The electric oil pump according to claim 1, wherein the busbar holder includes:
   the holder main body portion that is recessed from the one side to the another side in the axial direction; and
   the secured portion that projects further outward than a width between two ends of the holder main body portion from an end of the holder main body portion on one end side;
   the holder main body portion is in the circuit board housing such that a recessed end that is recessed in a recessed shape is directed to the one side in the axial direction; and
   the secured portion is on a bottom portion of the circuit board housing and is secured to the bottom portion via a securing fastener.

5. The electric oil pump according to claim 4, wherein the securing fastener is a male screw.

6. The electric oil pump according to claim 1, wherein the busbar holder and the busbar terminal are defined by an integrally molded article made of a resin.

7. The electric oil pump according to claim 6, wherein a gravity center position of the inverter assembly is located at a position deviated from a gravity center position of the motor when the inverter assembly is seen from the another side in the axial direction to the one side in the axial direction.

8. The electric oil pump according to claim 1, wherein
   the inverter assembly includes a base plate made of a metal that is on one side of the inverter housing in the axial direction and is widened in the radial direction; and
   the base plate is secured to the bottom portion of the motor housing of the motor.

9. The electric oil pump according to claim 8, wherein a gravity center position of the inverter assembly is located at a position deviated from a gravity center position of the motor when the inverter assembly is seen from the another side in the axial direction to the one side in the axial direction.

* * * * *